United States Patent
Jin et al.

(10) Patent No.: US 11,783,861 B2
(45) Date of Patent: Oct. 10, 2023

(54) TRANSITION TYPE DETERMINATION METHOD AND APPARATUS, AND ELECTRONIC DEVICE AND STORAGE MEDIUM

(71) Applicants: Beijing Bytedance Network Technology Co., Ltd., Beijing (CN); BYTEDANCE INC., Los Angeles, CA (US)

(72) Inventors: Xiaojie Jin, Los Angeles, CA (US); Xuchen Song, Los Angeles, CA (US); Gen Li, Beijing (CN); Yan Wang, Beijing (CN); Xiaohui Shen, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/087,420

(22) Filed: Dec. 22, 2022

(65) Prior Publication Data
US 2023/0126653 A1  Apr. 27, 2023

Related U.S. Application Data

(63) Continuation of application No. PCT/CN2021/102531, filed on Jun. 25, 2021.

(30) Foreign Application Priority Data

Jun. 29, 2020  (CN) .................. 202010611568.2

(51) Int. Cl.
*G11B 27/031* (2006.01)
*G06V 20/40* (2022.01)

(52) U.S. Cl.
CPC ............ *G11B 27/031* (2013.01); *G06V 20/48* (2022.01)

(58) Field of Classification Search
None
See application file for complete search history.

(56) References Cited

U.S. PATENT DOCUMENTS

| 7,512,886 B1 | 3/2009 | Herberger et al. |
| 8,189,114 B2* | 5/2012 | Petersohn ............. H04N 5/147 348/700 |

(Continued)

FOREIGN PATENT DOCUMENTS

| CN | 101308570 A | 11/2008 |
| CN | 105069827 A | 11/2015 |

(Continued)

OTHER PUBLICATIONS

ISA China Patent Office, International Search Report and Written Opinion issued in Application No. PCT/CN2021/102531, dated Sep. 27, 2021, WIPO, 12 pages.

(Continued)

*Primary Examiner* — Gelek W Topgyal
(74) *Attorney, Agent, or Firm* — Alleman Hall Creasman & Tuttle LLP

(57) ABSTRACT

Provided are a transition type determination method, an electronic device and a storage medium. The method includes: acquiring a picture matching degree of a candidate transition type with a transition position between two adjacent video clips, and acquiring a music matching degree of the candidate transition type; determining, based on the acquired image matching degree and the acquired music matching degree, a matching degree of the candidate transition type at the transition position; and determining, according to the matching degree, whether to determine the candidate transition type as a target transition type, where (Continued)

the target transition type is used for a transition effect between the two adjacent video clip.

20 Claims, 4 Drawing Sheets

(56) References Cited

U.S. PATENT DOCUMENTS

| | | | |
|---|---|---|---|
| 10,540,610 B1* | 1/2020 | Yang | H04L 51/42 |
| 11,423,945 B1* | 8/2022 | Seth | G11B 27/34 |
| 2005/0075881 A1* | 4/2005 | Rigazio | G10L 15/26 |
| | | | 704/E15.045 |
| 2005/0217462 A1* | 10/2005 | Thomson | G10H 1/368 |
| | | | 84/612 |
| 2011/0292244 A1* | 12/2011 | Deever | G11B 27/10 |
| | | | 348/231.2 |
| 2019/0058929 A1* | 2/2019 | Young | H04N 21/235 |
| 2019/0065856 A1 | 2/2019 | Harris et al. | |
| 2019/0306100 A1* | 10/2019 | Guthery | G10L 15/26 |
| 2021/0084239 A1* | 3/2021 | Pinskaya | G11B 27/005 |
| 2021/0084389 A1* | 3/2021 | Young | H04N 21/8547 |

FOREIGN PATENT DOCUMENTS

| | | |
|---|---|---|
| CN | 105516618 A | 4/2016 |
| CN | 107888988 A | 4/2018 |
| CN | 109451360 A | 3/2019 |
| CN | 109739591 A | 5/2019 |
| CN | 110493637 A | 11/2019 |
| CN | 111083393 A | 4/2020 |
| CN | 111263241 A | 6/2020 |

OTHER PUBLICATIONS

Intellectual Property India, Examination Report issued in Indian Application No. 202227074974, dated Mar. 13, 2023, 6 pages.
China National Intellectual Property Administration, Notice of Allowance Issued in Application No. 202010611568.2, dated Jul. 27, 2023, 15 pages.
"Teach you how to make "micro video": One minute to be a movie master," The Computers and Networks, vol. 39, No. 13, Jun. 15, 2013, 4 pages.
Bhaumik, H et al., "Video Shot Segmentation Using Spatio-Temporal Fuzzy Hostility Index and Automatic Threshold," Proceedings of the Fourth International Conference on Communication Systems and Network Technologies, Apr. 9, 2014, Bhopal, India, 6 pages.

* cited by examiner

TRANSITION TYPE DETERMINATION METHOD AND APPARATUS, AND ELECTRONIC DEVICE AND STORAGE MEDIUM

CROSS-REFERENCE TO RELATED APPLICATIONS

This application is a continuation of the International application PCT/CN2021/102531, filed on Jun. 25, 2021. This International application claims priority to Chinese Patent Application No. 202010611568.2, filed on Jun. 29, 2020. The contents of the above applications are hereby incorporated by reference in their entireties.

TECHNICAL FIELD

The present disclosure relates to the field of computer technologies, and particularly to a transition type determination method and apparatus, an electronic device, and a storage medium.

BACKGROUND

When editing a video, video creators need to manually add a transition effect between each pair of adjacent video clips. During this process, the creators need to watch the video repeatedly so as to select a suitable transition effect for adjacent video clips, which consumes a lot of labor and time costs. Moreover, the fitness of the transition effect depends on the professional experience of the creators. It is often difficult for creators with insufficient professional experience to create a suitable transition effect, thus affecting the quality of the video.

Therefore, how to quickly provide a suitable transition effect for a video has become a technical problem that needs to be solved urgently at present.

SUMMARY

Embodiments of the present disclosure provide a transition type determination method and apparatus, an electronic device, and a storage medium, which aim to solve the technical problem in the related art that it is difficult to quickly add a suitable transition effect to a video.

In a first aspect, an embodiment of the present disclosure provides a transition type determination method, including: acquiring a picture matching degree of a candidate transition type with a transition position between two adjacent video clips, and acquiring a music matching degree of the candidate transition type, where the picture matching degree is determined according to the two adjacent video clips and the candidate transition type, and the music matching degree is determined according to the candidate transition type and background music of a video to which the two adjacent video clips belong; determining, based on the acquired picture matching degree and the acquired music matching degree, a matching degree of the candidate transition type at the transition position; and determining, according to the matching degree, whether to determine the candidate transition type as a target transition type for the transition position, where the target transition type is used for a transition effect between the two adjacent video clips.

In the above-mentioned embodiment of the present disclosure, in an implementation, if the transition position is a designated transition position in the video, the target transition type at the transition position is a designated transition type corresponding to the designated transition position.

In the above-mentioned embodiment of the present disclosure, in an implementation, the determining, according to the matching degree, whether to determine the candidate transition type as a target transition type for the transition position includes: adding a first adjustment coefficient to the matching degree of the candidate transition type, when the transition position is the designated transition position in the video and if the candidate transition type is another transition type other than the designated transition type, where the first adjustment coefficient is used to make the candidate transition type excluded for the target transition type.

In the above embodiment of the present disclosure, in an implementation, if the target transition type occurs at the transition position, the number of occurrences of the target transition type is less than a first specified number of times, and/or the number of consecutive occurrences of the target transition type is less than a second specified number of times.

In the above-mentioned embodiment of the present disclosure, in an implementation, the determining, according to the matching degree, whether to determine the candidate transition type as a target transition type for the transition position includes: adding a second adjustment coefficient to the matching degree of the candidate transition type, when the candidate transition type occurs at the transition position and if the number of occurrences of the candidate transition type is greater than or equal to the first specified number of times, and/or if the number of consecutive occurrences of the candidate transition type is greater than or equal to the second specified number of times, where the second adjustment coefficient is used to make the candidate transition type excluded for the target transition type.

In the above-mentioned embodiment of the present disclosure, in an implementation, the determining, according to the matching degree, whether to determine the candidate transition type as a target transition type for the transition position, further includes: when the transition position is a first transition position of the video, determining the matching degree of the candidate transition type at the first transition position, as a largest matching degree of the candidate transition type at the transition position; when the transition position is a non-first transition position of the video, determining, based on the matching degree of the candidate transition type at this transition position, and on respective largest matching degrees of the candidate transition type and other candidate transition types at a previous transition position preceding this transition position in the video, a largest matching degree of the candidate transition type at this transition position, and a candidate transition type that should be selected for the previous transition position when this transition position has the largest matching degree; and selecting a corresponding target transition type for each transition position of the video, based on respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

In a second aspect, an embodiment of the present disclosure provides a transition type determination apparatus, including: an initial matching degree acquisition unit, configured to acquire a picture matching degree of a candidate transition type with a transition position between two adjacent video clips, and acquire a music matching degree of the candidate transition type, where the picture matching degree is determined according to the two adjacent video clips and the candidate transition type, and the music matching degree is determined according to the candidate transition type and background music of a video to which the two adjacent video clips belong; a transition position matching degree determination unit, configured to determine, based on the acquired picture matching degree and the acquired music matching degree, a matching degree of the candidate transition type at the transition position; and a target transition type selection unit, configured to determine, according to the matching degree, whether to determine the candidate transition type as a target transition type for the transition position, where the target transition type is used for a transition effect between the two adjacent video clips.

In the above embodiment of the present disclosure, in an implementation, the target transition type selection unit is configured to: if the transition position is a designated transition position in the video, determine a designated transition type corresponding to the designated transition position, as the target transition type at the transition position.

In the above embodiment of the present disclosure, in an implementation, the target transition type selection unit is configured to: add a first adjustment coefficient to the matching degree of the candidate transition type, when the transition position is the designated transition position in the video and if the candidate transition type is another transition type other than the designated transition type, where the first adjustment coefficient is used to make the candidate transition type excluded for the target transition type.

In the above embodiment of the present disclosure, in an implementation, if the target transition type occurs at the transition position, the number of occurrences of the target transition type is less than a first specified number of times, and/or the number of consecutive occurrences of the target transition type is less than a second specified number of times.

In the above embodiment of the present disclosure, in an implementation, the target transition type selection unit is configured to: add a second adjustment coefficient to the matching degree of the candidate transition type, when the candidate transition type occurs at the transition position and if the number of occurrences of the candidate transition type is greater than or equal to the first specified number of times, and/or if the number of consecutive occurrences of the candidate transition type is greater than or equal to the second specified number of times, where the second adjustment coefficient is used to make the candidate transition type excluded for the target transition type.

In the above embodiment of the present disclosure, in an implementation, the target transition type selection unit is further configured to: when the transition position is a first transition position of the video, determine the matching degree of the candidate transition type at the first transition position, as a largest matching degree of the candidate transition type at the transition position; when the transition position is a non-first transition position of the video, determine, based on the matching degree of the candidate transition type at this transition position, and on respective largest matching degrees of the candidate transition type and other candidate transition types at a previous transition position preceding this transition position in the video, a largest matching degree of the candidate transition type at this transition position, and a candidate transition type that should be selected for the previous transition position when this transition position has the largest matching degree; and select a corresponding target transition type for each transition position of the video, based on the respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

In a third aspect, an embodiment of the present disclosure provides an electronic device, including: at least one processor, and a memory communicatively connected with the at least one processor. The memory stores instructions executable by the at least one processor. The instructions are configured to execute the method described in any one of the above-mentioned first aspect.

In a fourth aspect, an embodiment of the present disclosure provides a storage medium storing computer-executable instructions thereon. The computer-executable instructions are configured to execute the method described in any one of the above-mentioned first aspect.

In a fifth aspect, an embodiment of the present disclosure provides a computer program product, which includes a computer program carried on a computer-readable medium. The computer program, when being executed by a processor, causes the processor to implement the method described in any one of the above-mentioned first aspect.

In a sixth aspect, an embodiment of the present disclosure provides a computer program, which, when running on an electronic device, causes the electronic device to implement the method described in any one of the above-mentioned first aspect.

The above technical solutions provide a new technical proposal of automatically selecting a transition type, which replaces the technical solution in the related art that requires creators to manually set the transition effects.

Specifically, a to-be-processed video has multiple clips. Among the multiple clips, there is a transition position between every two adjacent video clips. Furthermore, multiple candidate transition types are preset, and for each transition position, a target transition type needs to be selected from the multiple candidate transition types, so as to perform the respective transition operation. The following describes in detail how to determine, for a transition position, whether a candidate transition type is its target transition type.

First, a picture matching degree of the candidate transition type at the transition position of the video and a music matching degree of the candidate transition type are acquired.

The picture matching degree is determined according to the two adjacent video clips and the candidate transition type. The picture matching degree of the candidate transition type at the transition position represents the fitness of the candidate transition type to the pictures of the two video clips corresponding to the transition position.

In a case where the to-be-processed video is provided with background music, each video clip and each transition position in the video also use the background music. The music matching degree is determined according to the candidate transition type and the background music of the video to which the two adjacent video clips corresponding to the transition position belong. The music matching degree represents the fitness to the background music of the video when the candidate transition type is adopted at the transition position.

Next, based on the acquired picture matching degree and the acquired music matching degree, the matching degree of the candidate transition type at the transition position is determined. For a candidate transition type at a transition position, the overall fitness, i.e., the matching degree, of the candidate transition type at the transition position may be determined based on the fitness of the candidate transition type to the pictures of the two video clips corresponding to the transition position in combination with the fitness of the candidate transition type to the background music of the video. In other words, the matching degree of the candidate transition type at the transition position accurately and reliably shows the overall fitness of the candidate transition type to the background music of the video and to the pictures of the two video clips corresponding to the transition position. With the accurate and reliable matching degree of the candidate transition type with the transition position, the fitness of the target transition type finally selected for the transition position is also improved.

Finally, according to the matching degree of the candidate transition type at the transition position, it is determined whether the candidate transition type is the target transition type for the transition position. For any transition position, the target transition type selected therefor is a candidate transition type among the multiple candidate transition types which has high fitness to the transition position and achieves the best transition effect. In other words, if the matching degree of the candidate transition type at the transition position meets the above condition, the candidate transition type is determined as the target transition type for the transition position; and if the matching degree of the candidate transition type at the transition position does not meet the above condition, the candidate transition type is not determined as the target transition type for the transition position.

Through the above technical solutions, a transition type with high fitness to a transition position and enabling the best transition effect can be automatically selected for the transition position, which not only reduces the difficulty in implementing video transition, but also enables high-quality video transition effects, improving the user experience.

BRIEF DESCRIPTION OF DRAWINGS

In order to illustrate the technical solutions of the embodiments of the present disclosure more clearly, the drawings needed to be used for the embodiments are briefly introduced hereafter. Obviously, the drawings in the following description illustrates only some embodiments of the present disclosure. For those of ordinary skill in the art, other drawings can also be obtained from these drawings without any creative effort.

DESCRIPTION OF EMBODIMENTS

In order to better understand the technical solutions of the present disclosure, the embodiments of the present disclosure are described in detail below with reference to the accompanying drawings.

It should be clarified that the described embodiments here are only a part, rather than all, of the embodiments of the present disclosure. Based on the embodiments in the present disclosure, all other embodiments, obtained by those of ordinary skill in the art without any creative work, should fall within the scope of protection of the present disclosure.

The terms used in the embodiments of the present disclosure are only for the purpose of describing specific embodiments, and are not intended to limit the present disclosure. In addition, it should be noted that the numerical numbers 1 to 10 used in combination with the embodiments, such as Embodiment 1, Embodiment 2, ... and Embodiment 10, do not imply a relative importance between these embodiments, or do not imply that the embodiments are distinct from each other and cannot be combined with each other; rather, this is just for cease of description of the various embodiments, and the various embodiments can be combined with each other without conflict. As used in the embodiments and the appended claims of the present disclosure, the singular forms "a", "an", and "the" are intended to include the plural forms as well, unless the context clearly dictates otherwise.

Embodiment 1

A to-be-processed video has multiple clips. Among the multiple clips, there is a transition position between every two adjacent video clips. Furthermore, multiple candidate transition types are preset, and for each transition position, a target transition type needs to be selected from the multiple candidate transition types, so as to perform the respective transition operation. Next, referring to FIG. 1, it is described in detail how to determine, for a transition position, whether a candidate transition type is its target transition type.

Figure 1:
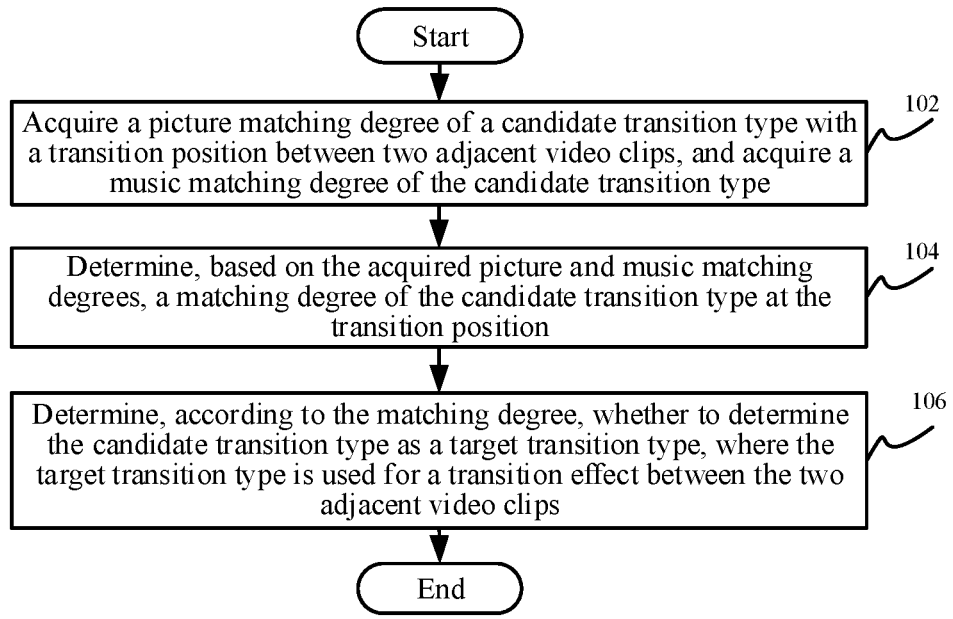
FIG. 1 illustrates a flowchart of a transition type determination method according to an embodiment of the present disclosure.

As shown in FIG. 1, the flow of a transition type determination method according to an embodiment of the present disclosure includes steps as follows.

At step 102, a picture matching degree of a candidate transition type with a transition position between two adjacent video clips is acquired, and a music matching degree of the candidate transition type is acquired.

First, the picture matching degree of the candidate transition type at the transition position of the video and the music matching degree of the candidate transition type are acquired.

The picture matching degree is determined according to the two adjacent video clips and the candidate transition type. The picture matching degree of the candidate transition type at the transition position represents the fitness of the candidate transition type to the pictures of the two video clips corresponding to the transition position.

In a case where the to-be-processed video is provided with background music, each video clip and each transition position in the video also use the background music. The music matching degree is determined according to the candidate transition type and the background music of the video to which the two adjacent video clips corresponding to the transition position belong. The music matching degree represents the fitness to the background music of the video when the candidate transition type is adopted at the transition position.

At step 104, the matching degree of the candidate transition type at the transition position is determined, based on the acquired picture matching degree and the acquired music matching degree.

Next, based on the acquired picture matching degree and the acquired music matching degree, the matching degree of the candidate transition type at the transition position is determined. For a candidate transition type at a transition position, the overall fitness, i.e., the matching degree, of the candidate transition type at the transition position may be determined based on the fitness of the candidate transition type to the pictures of the two video clips corresponding to the transition position in combination with the fitness of the candidate transition type to the background music of the video.

In other words, the matching degree of the candidate transition type at the transition position accurately and reliably shows the overall fitness of the candidate transition type to the background music of the video and to the pictures of the two video clips corresponding to the transition position. With the accurate and reliable matching degree of the candidate transition type with the transition position, the fitness of the target transition type finally selected for the transition position is also improved.

At step 106, it is determined, according to the matching degree, whether to determine the candidate transition type as a target transition type for the transition position, where the target transition type is used for a transition effect between the two adjacent video clips.

Finally, it is determined, according to the matching degree of the candidate transition type at the transition position, whether the candidate transition type is the target transition type for the transition position. For any transition position, the target transition type selected therefor is a candidate transition type among the multiple candidate transition types which has high fitness to the transition position and achieves the best transition effect. In other words, if the matching degree of the candidate transition type at the transition position meets the above condition, the candidate transition type is determined as the target transition type for the transition position; and if the matching degree of the candidate transition type at the transition position does not meet the above condition, the candidate transition type is not determined as the target transition type for the transition position.

Through the above technical solutions, a transition type with high fitness to a transition position and enabling the best transition effect can be automatically selected for the transition position, which not only reduces the difficulty in implementing video transition, but also enables high-quality video transition effects, improving the user experience.

Embodiment 2

A to-be-processed video has multiple clips. Among the multiple clips, there is a transition position between every two adjacent video clips. Furthermore, multiple candidate transition types are preset, and for each transition position, a target transition type needs to be selected from the multiple candidate transition types, so as to perform the respective transition operation. Next, referring to FIG. 2, target transition types are determined for multiple transition positions respectively, from an overall perspective.

Figure 2:
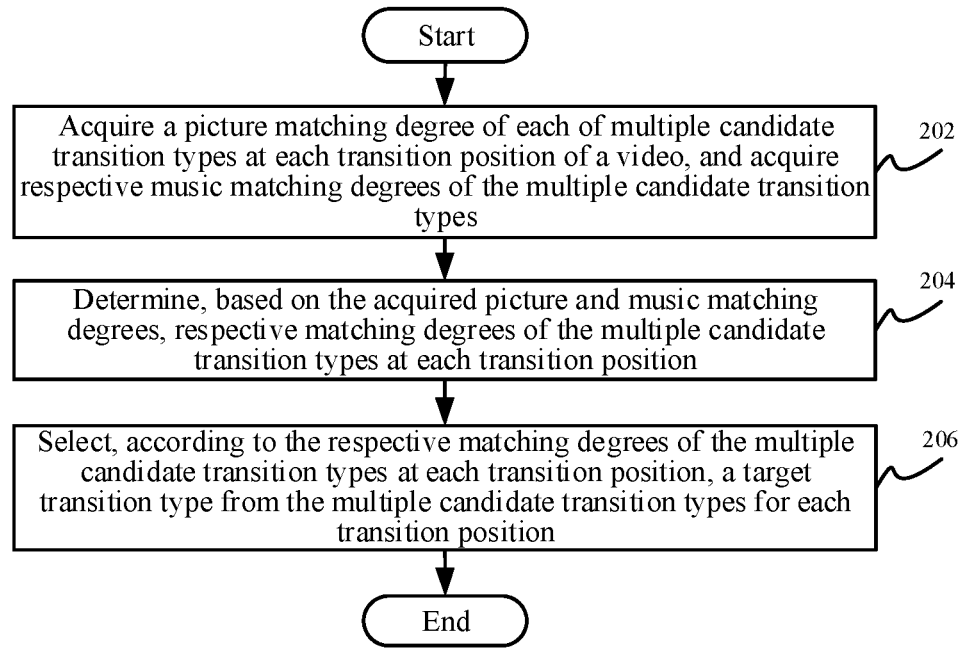
FIG. 2 illustrates a flowchart of a transition type determination method according to another embodiment of the present disclosure.

As shown in FIG. 2, the transition type determination method according to another embodiment of the present disclosure includes steps as follows.

At step 202, a picture matching degree of each of multiple candidate transition types at each transition position of the video is acquired, and respective music matching degrees of the multiple candidate transition types are acquired.

The to-be-processed video has multiple clips. Among the multiple clips, there is a transition position between every two adjacent video clips. Furthermore, multiple candidate transition types are preset, and for each transition position, a target transition type needs to be selected from the multiple candidate transition types, so as to perform the respective transition operation.

The picture matching degree is determined according to the video clips corresponding to each transition position, and each transition position corresponds to two video clips. For any candidate transition type, the picture matching degree of the candidate transition type at any transition position represents the fitness of the candidate transition type to the pictures of the two video clips corresponding to the transition position.

In a case where the to-be-processed video is provided with background music, each video clip and each transition position in the video also use the background music. For any candidate transition type, the music matching degree thereof represents the fitness of the candidate transition type to the background music of the video. Accordingly, the music matching degree is determined according to the background music of the video.

At step 204, respective matching degrees of the multiple candidate transition types at each transition position are determined, based on the acquired picture matching degrees and the acquired music matching degrees.

For any candidate transition type at any transition position, the overall fitness, i.e., the matching degree, of the candidate transition type at the transition position may be determined based on the fitness of the candidate transition type to the pictures of two video clips corresponding to the transition position in combination with the fitness of the candidate transition type to the background music of the video. In other words, for any candidate transition type at any transition position, the matching degree of the candidate transition type at the transition position accurately and reliably shows the overall fitness of the candidate transition type to the background music of the video and to the pictures of the two video clips corresponding to the transition position. With the accurate and reliable matching degrees of the individual candidate transition types with the transition position, the fitness of the target transition type finally selected for the transition position is also improved.

At step 206, a target transition type is selected from the multiple candidate transition types for each transition position, according to the matching degrees of the multiple candidate transition types at each transition position.

For any transition position, the target transition type selected therefor is a candidate transition type among the multiple candidate transition types which has high fitness to the transition position and achieves the best transition effect.

Embodiment 1 and Embodiment 2 provide a new technical solution of automatically selecting a transition type, which replaces the technical solution in the related art that requires the creator to manually set the transition effect. As a result, a transition type with high fitness to a transition position and enabling the best transition effect can be automatically selected for the transition position, which not only reduces the difficulty in implementing video transitions, but also enables high-quality video transition effects, improving the user experience.

Embodiment 3

On the basis of Embodiment 1 and Embodiment 2, when determining whether to determine the candidate transition type as the target transition type for the transition position, a further limitation is added.

In a possible design, if the transition position is a designated transition position in the video, a designated transition type corresponding to the designated transition position is determined as the target transition type for the transition position. In other words, a non-designated transition type is not allowed to occur at a designated transition position in the video. For example, for 3 transition positions in the video, transition position 1 is set as the designated transition position; and for 5 candidate transition types, candidate transition types 1, 3, 4, and 5 are set as the designated transition types; in this case, when selecting the target transition type for transition position 1, candidate transition type 2 is excluded for selection.

Further, when the transition position is a designated transition position in the video, if the candidate transition type is another transition type other than the designated transition type(s), a first adjustment coefficient is added to the matching degree of the candidate transition type. The first adjustment coefficient is used to make the candidate transition type excluded for the target transition type. The magnitude of the first adjustment coefficient is much larger than the magnitude of the matching degree of the candidate transition type. In this way, the matching degree of the candidate transition type after being added with the first adjustment coefficient differs enormously from the matching degrees of other candidate transition types in terms of magnitude, and it is not within a selectable matching degree range that the target transition type should have.

For example, for 3 transition positions in the video, transition position 1 is set as the designated transition position, the matching degrees of 5 candidate transition types at transition position 1 are respectively 0.11, 0.23, 0.13, 0.09, and 0.15, candidate transition types 1, 3, 4, and 5 are set as designated transition types, and the first adjustment coefficient whose magnitude differs greatly from the magnitudes of the above matching degrees is set as −100. In this case, since candidate transition type 2 is not the designated transition type for transition position 1, the matching degree of candidate transition type 2 at transition position 1 is added with the first adjustment coefficient. Accordingly, the matching degrees of the 5 candidate transition types at transition position 1 are 0.11, −99.77, 0.13, 0.09, and 0.15, respectively. As can be seen, the adjusted matching degree of candidate transition type 2 is much lower than the matching degrees of other candidate transition types, and it is not within a selectable matching degree range that the target transition type should have.

In another possible design, if the target transition type occurs at the transition position, the number of occurrences of the target transition type should be less than a first specified number of times, and/or the number of consecutive occurrences of the target transition type should be less than a second specified number of times.

Further, when the candidate transition type occurs at the transition position, if the number of occurrences of the candidate transition type is greater than or equal to the first specified number of times, and/or the number of consecutive occurrences of the candidate transition type is greater than or equal to the second specified number of times, a second adjustment coefficient is added to the matching degree of the candidate transition type. The second adjustment coefficient is used to make the candidate transition type excluded for the target transition type. In other words, if the number of occurrences of a candidate transition type at the transition positions reaches the first specified number of times, and/or the number of consecutive occurrences of the candidate transition type at the transition positions reaches the second specified number of times, it is determined that the candidate transition type is not the target transition type.

Similar to the above-mentioned scheme of adding the first adjustment coefficient, the magnitude of the second adjustment coefficient is also much larger than the magnitudes of the matching degrees of the candidate transition types. In this way, the matching degree of the candidate transition type after being added with the second adjustment coefficient differs enormously from the matching degrees of other candidate transition types in terms of magnitude, and it is not within the selectable matching degree range that the target transition type should have.

In summary, the designated transition position, the designated transition type, the first specified number of times, and the second specified number of times, etc. may all be set based on the needs of video editing, thereby further adapting to the actual editing needs and providing suitable transition effects at the transition positions.

Finally, based on the adjusted matching degree(s) and the matching degree(s) that do/does not need to be adjusted, the target transition type is selected for the transition position.

Embodiment 4

On the basis of Embodiment 3, in a possible design, for each transition position, a candidate transition type with the greatest matching degree may be directly selected as its target transition type.

In another possible design, when the transition position is a first transition position of the video, the matching degree of the candidate transition type at the first transition position may be determined as a largest matching degree of the candidate transition type at the transition position. When the transition position is a non-first transition position of the video, based on the matching degree of the candidate transition type at this transition position, and based on respective largest matching degrees of the candidate transition type and other candidate transition types at a previous transition position preceding this transition position in the video, a largest matching degree of the candidate transition type at this transition position is determined, and a candidate transition type that should be selected for the previous transition position when this transition position has the largest matching degree is determined. Based on the respective largest matching degrees of this candidate transition type and other candidate transition types at each of the non-first transition positions, and based on a candidate transition type that should be selected for the previous transition position preceding each of the non-first transition positions when this non-first transition position obtains its largest matching degree, a corresponding target transition type is selected for each transition position of the video.

Such steps may be implemented based on a dynamic planning algorithm. The dynamic planning algorithm generally needs to construct a retrieval structure. In the retrieval structure, each candidate transition type at each transition position corresponds to one element. For any candidate transition type at any transition position, the element includes the largest matching degree of the candidate transition type at the transition position, and the largest matching degree is determined based on the matching degree of the candidate transition type at the transition position obtained in Embodiments 1 to 3 and the respective largest matching degrees of the candidate transition type and other candidate transition types at the previous transition position preceding the transition position in the video. Of course, for the first transition position of the video, it does not have a previous transition position, and the largest matching degree of the candidate transition type at the first transition position may be directly determined as the matching degree of the candidate transition type at the first transition position obtained in Embodiments 1 to 3.

Further, for a candidate transition type at a non-first transition position, all candidate transition types at its previous transition position correspond to their own largest matching degrees; when a candidate transition type is selected for the previous transition position, if the sum of the largest matching degree corresponding to the selected candidate transition type at the previous transition position and the matching degree corresponding to the concerned candidate transition type at this non-first transition position is the largest, the information about selecting the candidate transition type for the previous transition position is also included as part of the element for the concerned candidate transition type at the non-first transition position. Finally, an optimal solution is retrieved in this retrieval structure with the dynamic planning algorithm. The establishment of the retrieval structure and the use of the dynamic planning algorithm are explained in detail in Embodiment 10 of the present disclosure, which will not be repeated here.

Embodiment 5

Figure 3:
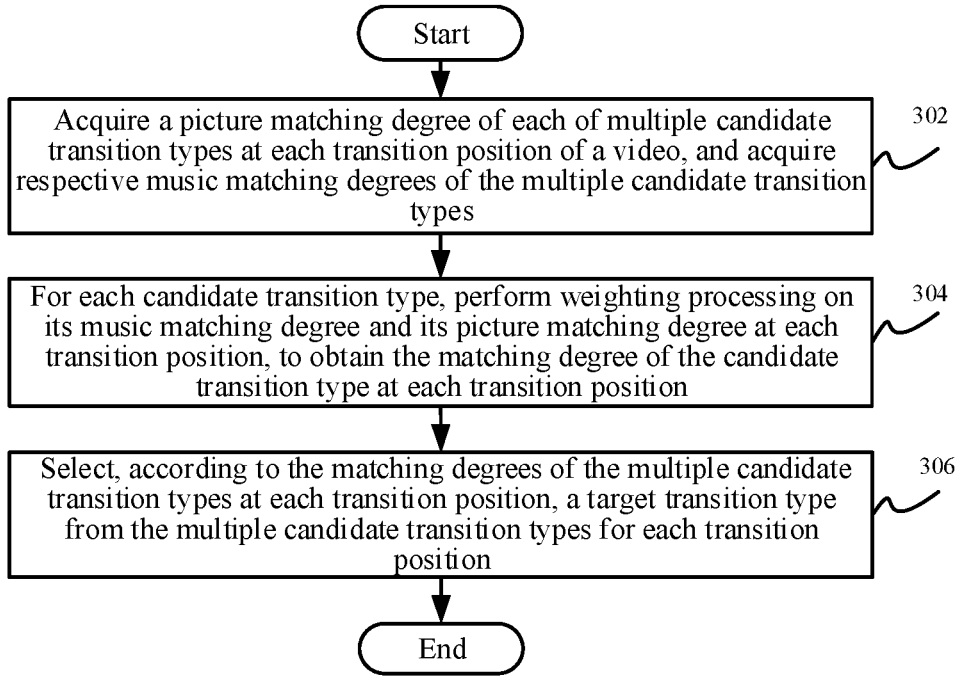
FIG. 3 illustrates a flowchart of a transition type determination method according to yet another embodiment of the present disclosure.

FIG. 3 shows a flowchart of a transition type determination method according to yet another embodiment of the present disclosure.

As shown in FIG. 3, the flow of the transition type determination method according to yet another embodiment of the present disclosure includes steps as follows.

At step 302, a picture matching degree of each of multiple candidate transition types at each transition position of the video is acquired, and respective music matching degrees of the multiple candidate transition types are acquired.

At step 304, for each candidate transition type, weighting processing is performed on its music matching degree and its picture matching degree at each transition position, to obtain the matching degree of the candidate transition type at each transition position.

Specifically, weights may be set for the music matching degree and the picture matching degree respectively. Based on the weights, weighting processing is performed on the music matching degree and the picture matching degree of each of the multiple candidate transition types at each transition position, to obtain the fitness of each candidate transition type at each transition position.

Of course, in this disclosure, the approaches for obtaining the matching degree based on the music matching degree and the picture matching degree include, but are not limited to, the above-mentioned weighting processing, and may also include any calculation method meeting actual needs, such as variance processing, standard deviation processing, and mathematical modeling.

At step 306, according to the matching degrees of the multiple candidate transition types at each transition position, a target transition type is selected from the multiple candidate transition types for each transition position.

For any candidate transition type at any transition position, the matching degree therefor obtained through weighting processing can accurately and reliably show the overall fitness of the candidate transition type to the background music of the video and to the pictures of two video clips corresponding to the transition position.

With such an accurate and reliable matching degree, the fitness of the target transition type finally selected for the transition position is also improved. As a result, it is possible to automatically select a transition type with high fitness and the best transition effect for the transition position, which not only reduces the difficulty in implementing video transitions, but also enables high-quality video transition effects.

Embodiment 6

Figure 4:
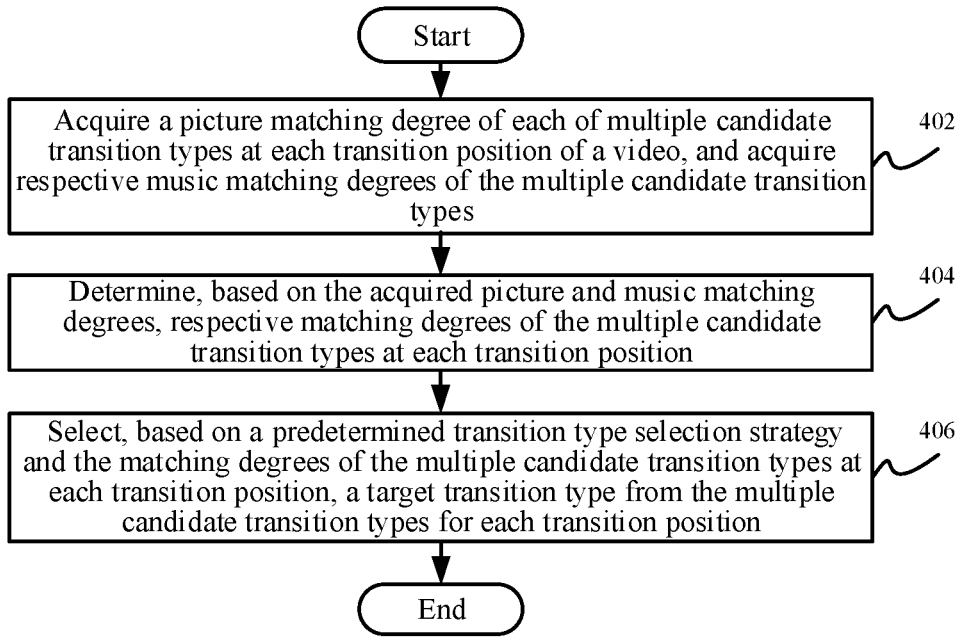
FIG. 4 illustrates a flowchart of a transition type determination method according to still another embodiment of the present disclosure.

FIG. 4 shows a flowchart of a transition type determination method according to still another embodiment of the present disclosure.

As shown in FIG. 4, the flow of the transition type determination method according to still another embodiment of the present disclosure includes steps as follows.

At step 402, a picture matching degree of each of multiple candidate transition types at each transition position of the video is acquired, and respective music matching degrees of the multiple candidate transition types are acquired.

At step 404, respective matching degrees of the multiple candidate transition types at each transition position are determined, based on the acquired picture matching degrees and the acquired music matching degrees.

For any candidate transition type at any transition position, the overall fitness, i.e., the matching degree, of the candidate transition type at the transition position may be determined based on the fitness of the candidate transition type to the pictures of two video clips corresponding to the transition position in combination with the fitness of the candidate transition type to the background music of the video. In other words, for any candidate transition type at any transition position, the matching degree of the candidate transition type at the transition position accurately and reliably shows the overall fitness of the candidate transition type to the background music of the video and to the pictures of the two video clips corresponding to the transition position. With the accurate and reliable matching degrees of the individual candidate transition types with the transition position, the fitness of the target transition type finally selected for the transition position is also improved.

Specifically, the approaches for obtaining the matching degree based on the music matching degree and the picture matching degree include, but are not limited to, weighting processing, and may also include any calculation method meeting actual needs, such as variance processing, standard deviation processing, and mathematical modeling.

At step 406, based on a predetermined transition type selection strategy and the matching degrees of the multiple candidate transition types at each transition position, a target transition type is selected from the multiple candidate transition types for each transition position.

A predetermined transition type selection strategy may be set, while considering the matching degrees of the multiple candidate transition types at each transition position. The predetermined transition type selection strategy defines a specific condition that the transition types should meet for meeting requirements of an actual transition effect. The use of the predetermined transition type selection strategy helps to make the finally selected transition type produce a good transition effect consequently, and have higher fitness to the transition position and even the entire video.

In a possible design, the predetermined transition type selection strategy includes, but is not limited to, any one or a combination of the following: a strategy that defines whether a transition type is allowed or prohibited to occur at a designated transition position, and a strategy that defines the number of occurrences of a transition type. The strategy limiting the number of occurrences of a transition type includes that: the number of occurrences of a first transition type is less than the first specified number of times, and/or the number of consecutive occurrences of a second transition type is less than the second specified number of times.

Taking a case where there are 5 candidate transition types, 4 video clips of the video, and 3 transition positions as an example, the 5 candidate transition types are respectively transition type 0, transition type 1, transition type 2, transition type 3 and transition type 4, and the transition positions are respectively transition position 0, transition position 1 and transition position 2. The predetermined transition type selection strategy may include that: transition type 2 is prohibited from occurring at transition position 0 and transition position 2, transition type 1 is prohibited from occurring twice, and transition type 2 is prohibited from consecutively occurring twice.

Embodiment 7

Figure 5:
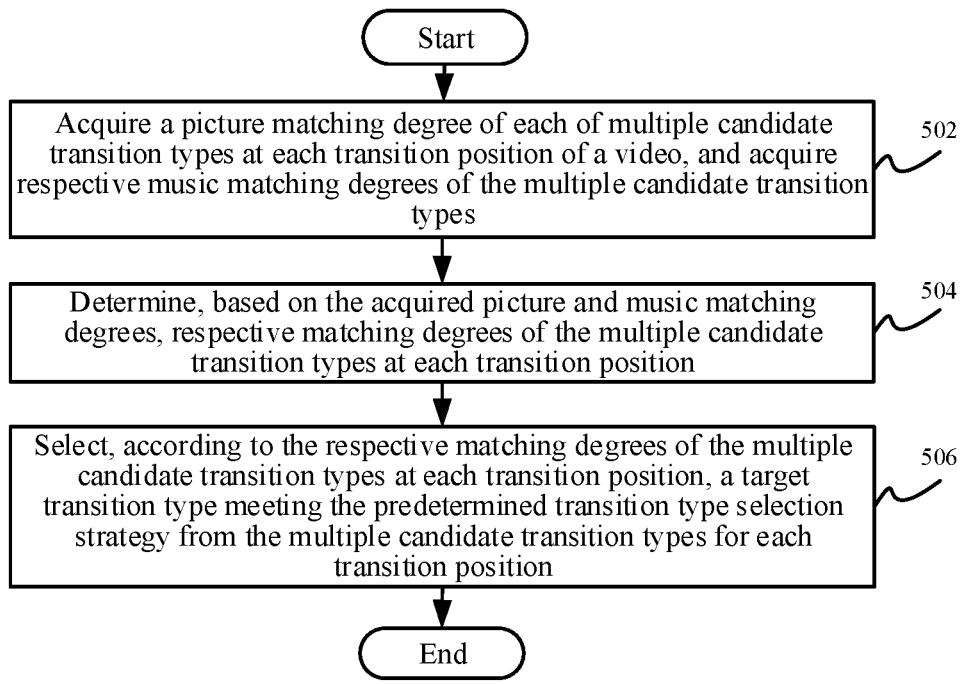
FIG. 5 illustrates a flowchart of a transition type determination method according to still yet another embodiment of the present disclosure.

Based on any of the foregoing embodiments, FIG. 5 shows a flowchart of a transition type determination method according to still yet another embodiment of the present disclosure.

As shown in FIG. 5, the flow of the transition type determination method according to still yet another embodiment of the present disclosure includes steps as follows.

At step 502, a picture matching degree of each of multiple candidate transition types at each transition position of the video is acquired, and respective music matching degrees of the multiple candidate transition types are acquired.

At step 504, respective matching degrees of the multiple candidate transition types at each transition position are determined, based on the acquired picture matching degrees and the acquired music matching degrees.

At step 506, according to the respective matching degrees of the multiple candidate transition types at each transition position, a target transition type meeting the predetermined transition type selection strategy is selected from the multiple candidate transition types for each transition position.

In the above technical solution, for any transition position, the matching degrees corresponding to multiple candidate transition types at this transition position may be determined first. On this basis, in combination with the matching degree corresponding to each candidate transition type, it may be determined whether each transition type meets the predetermined transition type selection strategy.

In a possible design, for any transition position, if only one candidate transition type meets the predetermined transition type selection strategy, this candidate transition type is set as the target transition type for the transition position.

In another possible design, for any transition position, if two or more candidate transition types meet the predetermined transition type selection strategy, a candidate transition type with the largest matching degree is selected from the candidate transition types meeting the predetermined transition type selection strategy, as the target transition type for the transition position.

In yet another possible design, for any transition position, the matching degrees corresponding to the multiple candidate transition types at the transition position are ranked in a descending order. It is first determined whether the candidate transition type corresponding to the largest matching degree meets the predetermined transition type selection strategy. If yes, the candidate transition type corresponding to the largest matching degree is determined as the target transition type. And if not, the candidate transition type corresponding to the largest matching degree is discarded, and it is determined whether the candidate transition type corresponding to the second largest matching degree meets the predetermined transition type selection strategy, and so on, until a matching degree whose corresponding candidate transition type meets the predetermined transition type selection strategy is selected. The candidate transition type corresponding to the selected matching degree and meeting the predetermined transition type selection strategy is determined as the target transition type for the transition position.

Taking a case where there are 5 candidate transition types, 4 video clips of the video, and 3 transition positions as an example, the 5 candidate transition types are respectively transition type 0, transition type 1, transition type 2, transition type 3, and transition type 4, and the transition positions are respectively transition position 0, transition position 1 and transition position 2. The picture matching degrees of the individual candidate transition types at each transition position are shown in Table 1 below.

TABLE 1

|  | Transition type 0 | Transition type 1 | Transition type 2 | Transition type 3 | Transition type 4 |
| --- | --- | --- | --- | --- | --- |
| Transition position 0 | 0.4 | 0.1 | 0.2 | 0.17 | 0.13 |
| Transition position 1 | 0.1 | 0.35 | 0.15 | 0.2 | 0.2 |
| Transition position 2 | 0.3 | 0.4 | 0.12 | 0.08 | 0.1 |

The music matching degrees of the individual candidate transition types with the background music of the video are shown in Table 2 below.

TABLE 2

| Transition type 0 | Transition type 1 | Transition type 2 | Transition type 3 | Transition type 4 |
| --- | --- | --- | --- | --- |
| 0.2 | 0.15 | 0.3 | 0.25 | 0.15 |

The weight of the picture matching degree is preset as 0.4, and the weight of the music matching degree is preset as 0.6. For each candidate transition type, weighting processing is performed on the music matching degree of the candidate transition type and the picture matching degree of the candidate transition type at each transition position, to obtain the matching degree $S(i, j)$ of the candidate transition type at each transition position.

Among them, i represents the transition position, and the range of values for i is (0, 1, 2); j represents the candidate transition type, and the range of values for j is (0, 1, 2, 3, 4).

$S(0, 0)=0.4\times 0.4+0.6\times 0.2/3=0.2$ $S(0, 1)=0.4\times 0.1+0.6\times 0.15/3=0.07$ $S(0, 2)=0.4\times 0.2+0.6\times 0.3/3=0.14$ $S(0, 3)=0.4\times 0.17+0.6\times 0.25/3=0.118$ $S(0, 4)=0.4\times 0.13+0.6\times 0.15/3=0.082$ $S(1, 0)=0.4\times 0.1+0.6\times 0.2/3=0.08$ $S(1, 1)=0.4\times 0.35+0.6\times 0.15/3=0.17$ $S(1, 2)=0.4\times 0.15+0.6\times 0.3/3=0.12$ $S(1, 3)=0.4\times 0.2+0.6\times 0.25/3=0.13$ $S(1, 4)=0.4\times 0.2+0.6\times 0.15/3=0.11$ $S(2, 0)=0.4\times 0.3+0.6\times 0.2/3=0.16$ $S(2, 1)=0.4\times 0.4+0.6\times 0.15/3=0.19$ $S(2, 2)=0.4\times 0.12+0.6\times 0.3/3=0.108$ $S(2, 3)=0.4\times 0.08+0.6\times 0.25/3=0.082$ $S(2, 4)=0.4\times 0.1+0.6\times 0.15/3=0.07$ The S(i,j) obtained above are shown in Table 3 below.

TABLE 3

|  | Transition type 0 | Transition type 1 | Transition type 2 | Transition type 3 | Transition type 4 |
| --- | --- | --- | --- | --- | --- |
| Transition position 0 | 0.2 | 0.07 | 0.14 | 0.118 | 0.082 |
| Transition position 1 | 0.08 | 0.17 | 0.12 | 0.13 | 0.11 |
| Transition position 2 | 0.16 | 0.19 | 0.108 | 0.082 | 0.07 |

The predetermined transition type selection strategy may be set as follows: transition type 2 is prohibited from occurring at transition position 0 and transition position 2, and transition type 1 is prohibited from occurring twice.

In a possible design, according to a sequence from transition position 0 to transition position 2, the target transition types are respectively selected for the three transition positions.

Among them, for transition position 0, the largest matching degree S(0, 0) at this transition position corresponds to transition type 0. At this time, transition type 2 does not occur at transition position 0; and since it is the first transition position, there is not a case where transition type 1 occurs twice. Therefore, transition type 0 is determined as the target transition type for transition position 0.

For transition position 1, the largest matching degree S(1, 1) at this transition position corresponds to transition type 1. At this time, transition type 2 does not occur at transition position 1; and since the target transition type at the previous transition position 0 is transition type 0, transition type 1 occurs for the first time at the current transition position 1, and there is not a case where transition type 1 occurs twice. Therefore, transition type 1 is determined as the target transition type for transition position 1.

For transition position 2, the largest matching degree S(2, 1) at this transition position corresponds to transition type 1. At this time, transition type 2 does not occur at transition position 2; however, since the target transition type at the previous transition position 1 is transition type 1, transition type 1 occurs for the second time at the current transition position 2, which does not meet the requirement in the predetermined transition type selection strategy that transition type 1 is prohibited from occurring twice. In this case, the largest matching degree S(2, 1) is discarded, and it continues to make determination on the second largest matching degree S(2, 0) for transition position 2. S(2, 0) corresponds to transition type 0, where transition type 2 does not occur, and the requirement in the predetermined transition type selection strategy that transition type 1 is prohibited from occurring twice is met. Therefore, transition type 0 is determined as the target transition type for transition position 2.

In another possible design, according to a reverse order from transition position 2 to transition position 0, the target transition types are respectively selected for the three transition positions.

Among them, for transition position 2, the largest matching degree S(2, 1) at this transition position corresponds to transition type 1. At this time, transition type 2 does not occur at transition position 2; and since transition type 1 occurs for the first time, there is not a case where transition type 1 occurs twice. Therefore, transition type 1 is determined as the target transition type for transition position 2.

For transition position 1, the largest matching degree S(1, 1) at this transition position corresponds to transition type 1. At this time, transition type 2 does not occur at transition position 1; however, since the target transition type at the previous transition position 2 is transition type 1, transition type 1 occurs for the second time at the current transition position 1, which does not meet the requirement in the predetermined transition type selection strategy that transition type 1 is prohibited from occurring twice. In this case, the largest matching degree S(1, 1) is discarded, and it continues to make determination on the second largest matching degree S(1, 3) for transition position 1. S(1, 3) corresponds to transition type 3, where transition type 2 does not occur, and the requirement in the predetermined transition type selection strategy that transition type 1 is prohibited from occurring twice is met. Therefore, transition type 3 is determined as the target transition type for transition position 1.

For transition position 0, the largest matching degree S(0, 0) at this transition position corresponds to transition type 0. At this time, transition type 2 does not occur at transition position 0, and there is not a case where transition type 1 occurs twice. Therefore, transition type 0 is determined as the target transition type for transition position 0.

Embodiment 8

Figure 6:
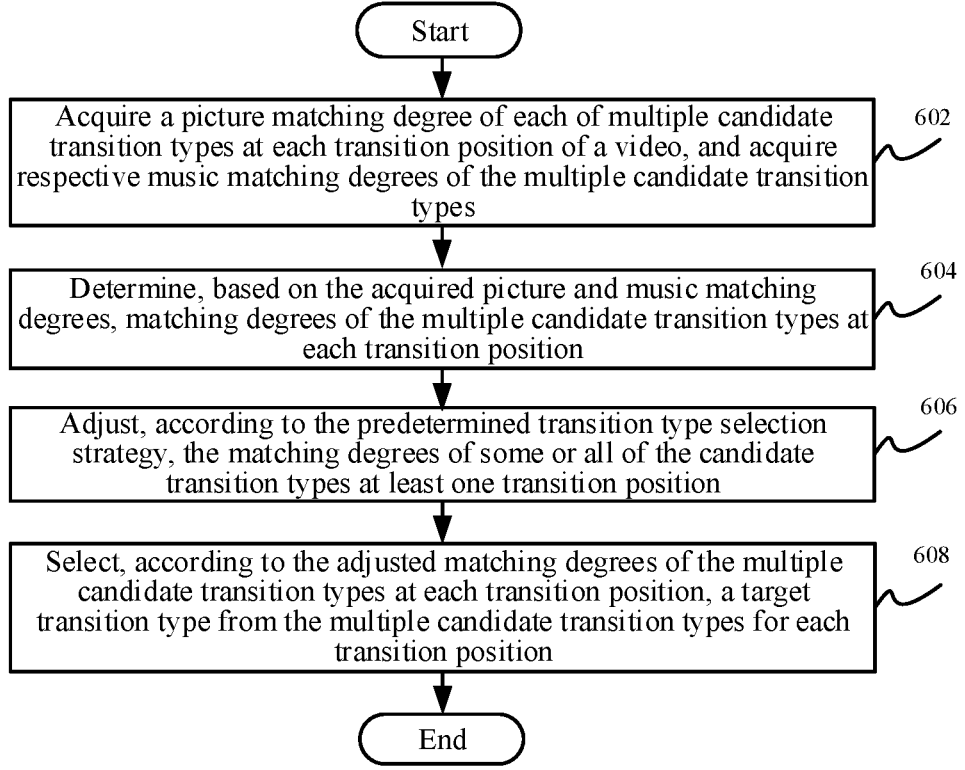
FIG. 6 illustrates a flowchart of a transition type determination method according to still yet another embodiment of the present disclosure.

On the basis of Embodiment 7, FIG. 6 shows a flowchart of a transition type determination method according to still yet another embodiment of the present disclosure.

As shown in FIG. 6, the flow of the transition type determination method according to still yet another embodiment of the present disclosure includes steps as follows.

At step 602, a picture matching degree of each of multiple candidate transition types at each transition position of the video is acquired, and respective music matching degrees of the multiple candidate transition types are acquired.

At step 604, respective matching degrees of the multiple candidate transition types at each transition position are determined, based on the acquired picture matching degrees and the acquired music matching degrees.

At step 606, the matching degrees of some or all of the candidate transition types at least one transition position are adjusted, according to the predetermined transition type selection strategy.

The predetermined transition type selection strategy defines a specific condition that the transition types should meet for meeting requirements of an actual transition effect. The use of the predetermined transition type selection strategy helps to make the finally selected transition type produce a good transition effect consequently, and have higher fitness to the transition position and even the entire video. The predetermined transition type selection strategy includes, but is not limited to, one or a combination of the following: a strategy that defines whether a transition type is allowed or prohibited to occur at a designated transition position, and a strategy that defines the number of occurrences of a transition type. The strategy limiting the number of occurrences of a transition type includes but is not limited to the following: the number of occurrences of a first transition type is less than the first specified number of times, and/or the number of consecutive occurrences of a second transition type is less than the second specified number of times.

In order to facilitate subsequent calculations and reduce the difficulty of automatically selecting the transition type, a predetermined matching degree adjustment strategy may be added to the calculation process in the form of a matching degree adjustment coefficient.

For example, in the predetermined matching degree adjustment strategy, it is defined that the number of occurrences of the first transition type cannot reach the first specified number of times. For any transition position, if the number of occurrences of the first transition type at this transition position is less than the first specified number of times, it may be set that a first coefficient is subtracted from the matching degree of the first transition type at the transition position. For any transition position, if the number of occurrences of the first transition type at this transition position is greater than or equal to the first specified number of times, it may be set that a second coefficient is subtracted from the matching degree of the first transition type at the transition position. Among them, the first coefficient is much smaller than the second coefficient.

Further, the first coefficient may be set as 0, and the second coefficient may be set as 100. In this way, for any transition position, if the first transition type is selected therefor, and the number of occurrences of the first transition type reaches the first specified number of times, 100 is subtracted from the matching degree corresponding to the first transition type at the transition position; and if another transition type other than the first transition type is selected for the transition position, 0 is subtracted from the matching degree corresponding to the another transition type at the transition position. In the end, the adjusted matching degree corresponding to the first transition type will be much smaller than the adjusted matching degrees corresponding to other transition types. Thus, when the target transition type is selected for this transition position based on the adjusted matching degrees, the first transition type whose adjusted matching degree is minimal will certainly not be selected.

At step 608, according to the adjusted matching degrees of the multiple candidate transition types at each transition position, a target transition type is selected from the multiple candidate transition types for each transition position.

The adjusted matching degree based on the predetermined matching degree adjustment strategy reflects the fitness of the transition type to the transition position under a condition that the transition type at the transition positions and/or the transition position meets requirements of an actual transition effect. The higher the adjusted matching degree of a transition type at the transition position, the better the transition effect obtained by using the transition type at the transition position. Through the above technical solution, a transition type with high fitness to a transition position and enabling a high-quality transition effect can be automatically selected for the transition position, which not only reduces the difficulty in implementing video transition, but also enables high-quality video transition effects, improving the user experience.

Embodiment 9

Figure 7:
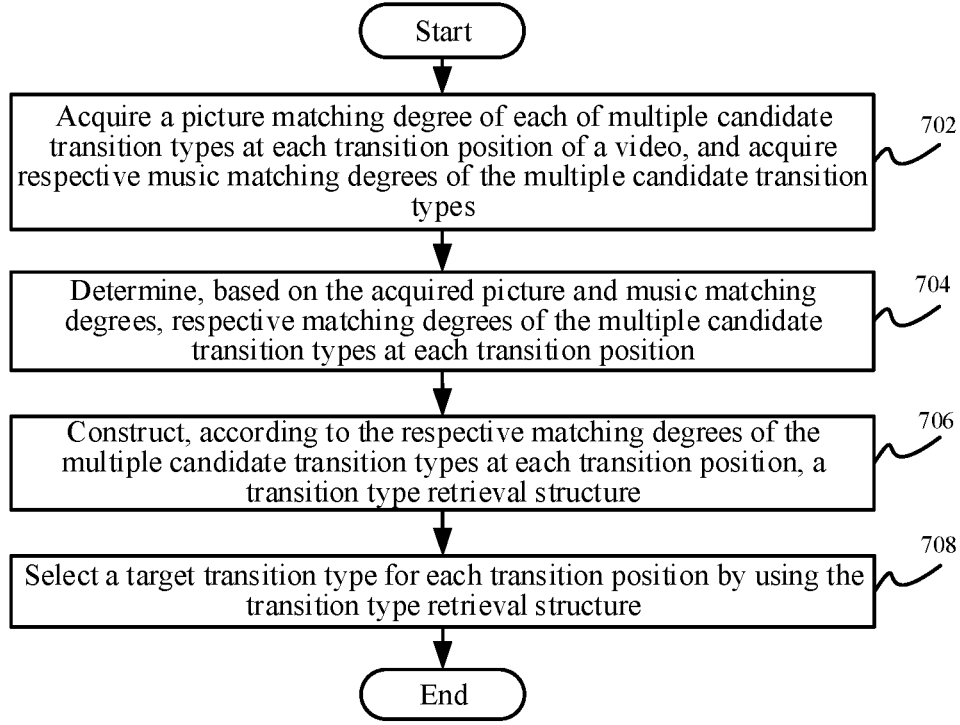
FIG. 7 illustrates a flowchart of a transition type determination method according to still yet another embodiment of the present disclosure.

FIG. 7 shows a flowchart of a transition type determination method according to still yet another embodiment of the present disclosure.

As shown in FIG. 7, the flow of the transition type determination method according to still yet another embodiment of the present disclosure includes steps as follows.

At step 702, a picture matching degree of each of multiple candidate transition types at each transition position of the video is acquired, and respective music matching degrees of the multiple candidate transition types are acquired.

At step 704, respective matching degrees of the multiple candidate transition types at each transition position are determined, based on the acquired picture matching degrees and the acquired music matching degrees.

At step 706, a transition type retrieval structure is constructed, according to the matching degrees of the multiple candidate transition types at each transition position.

At step 708, a target transition type is selected for each transition position by using the transition type retrieval structure.

In a possible design, the transition type retrieval structure may be constructed by directly using the matching degrees of the multiple candidate transition types at each transition position as elements.

In the case where the transition type retrieval structure is constructed by directly using the matching degrees of the multiple candidate transition types at each transition position as elements, for each transition position, a candidate transition type with the highest matching degree may be retrieved from the transition type retrieval structure, as the corresponding target transition type.

In another possible design, the transition type retrieval structure may be constructed by: adjusting, based on the predetermined transition type selection strategy, the matching degrees of the multiple candidate transition types at each transition position, and taking, as elements, the adjusted matching degrees of the multiple candidate transition types at each transition position.

In this case, the adjusted matching degree reflects the fitness of the transition type to the transition position under a condition that the transition type meets requirements of an actual transition effect. The higher the adjusted matching degree of a transition type at the transition position, the better the transition effect obtained by using the transition type at the transition position.

In yet another possible design, for any candidate transition type at any transition position, when the candidate transition type is selected as the target transition type for this transition position, for a previous transition position preceding this transition position, a candidate transition type, the sum of its matching degree at the previous transition position and the matching degree of the concerned candidate transition type at this transition position being the largest, is selected.

In this case, the transition type retrieval structure is constructed by: for any candidate transition type at any transition position, taking, as the structural elements, the matching degree of this candidate transition type, and a candidate transition type whose matching degree at the previous transition position plus the matching degree of this candidate transition type yields the largest sum. In this transition type retrieval structure, no matter which one of the multiple candidate transition types is selected as the target transition type for the initial transition position processed for the first time, a candidate transition type that enables a high-quality overall transition effect can be selected for each of other transition positions when selecting the target transition type.

In still yet another possible design, the matching degrees of the multiple candidate transition types at each transition position may be adjusted based on the predetermined transition type selection strategy. Next, for any candidate transition type at any transition position, when this candidate transition type is selected as the target transition type for this transition position, for a previous transition position preceding this transition position, a candidate transition type, the sum of its matching degree at the previous transition position and the matching degree of this candidate transition type at this transition position being the largest, is selected.

In this way, the transition type retrieval structure is constructed by: for any candidate transition type at any transition position, taking, as the structural elements, the adjusted matching degree of this candidate transition type, and a candidate transition type whose adjusted matching degree at the previous transition position plus the adjusted matching degree of this candidate transition type yields the largest sum. In this transition type retrieval structure, no matter which one of the multiple candidate transition types is selected as the target transition type for the initial transition position processed for the first time, a candidate transition type that enables an optimum overall transition effect can be selected for each of other transition positions when selecting the target transition type.

Embodiment 10

In the technical solutions of the present disclosure, the target transition type may be selected for each transition position by performing retrieval in the transition type retrieval structure with a predetermined algorithm. The predetermined algorithm includes, but is not limited to, dynamic planning algorithm, depth-first algorithm, hill-climbing algorithm, ant colony algorithm, particle swarm algorithm, and any other algorithm capable of selecting an optimal solution.

The dynamic planning algorithm for the transition type retrieval structure may be constructed by: based on historical selectable matching degrees at each transition position and the adjusted matching degrees of multiple candidate transition types at the transition position, determining respective selectable matching degrees corresponding to the multiple candidate transition types at each transition position.

Among them, the historical selectable matching degrees of the first transition position among the multiple transition positions are zero. For each of remaining transition positions in the multiple transition positions other than the first transition position, its historical selectable matching degrees are the specified selectable matching degrees of its own previous transition position. Specifically, the sum of the adjusted matching degree of each candidate transition type at each remaining transition position and each of the selectable matching degrees of its previous transition position under the multiple candidate transition types is calculated, and a selectable matching degree corresponding to the largest sum is a specified selectable match degree of the previous transition position preceding the remaining transition position.

Finally, the transition type retrieval structure is constructed by taking the following as structural elements: the selectable matching degree corresponding to each of the multiple candidate transition types at each transition position, and a historical transition position and a historical candidate transition type that correspond to a historical selectable matching degree used when the concerned selectable matching degree is determined.

The construction of the transition type retrieval structure and the process of retrieving in the transition type retrieval structure with the dynamic planning algorithm are described in detail below with reference to an example.

Taking a case where there are 5 candidate transition types, 4 video clips of the video, and 3 transition positions as an example, the 5 candidate transition types are respectively transition type 0, transition type 1, transition type 2, transition type 3, and transition type 4, the transition positions are respectively transition position 0, transition position 1 and transition position 2, and the distribution of the picture matching degrees and the music matching degrees are shown in Table 1 and Table 2 above.

The weight of the picture matching degree is preset as 0.4, and the weight of the music matching degree is preset as 0.6. For each candidate transition type, weighting processing is performed on its own music matching degree and its picture matching degree at each transition position, to obtain the matching degree $S(i, j)$ of the candidate transition type at each transition position, as shown in Table 3 above. Among them, i represents the transition position, and the range of values for i is (0, 1, 2); j represents the candidate transition type, and the range of values for j is (0, 1, 2, 3, 4).

The predetermined matching degree adjustment strategy may be set as follows: transition type 1 is prohibited from occurring at transition position 0 and transition position 2, and the same transition type is prohibited from occurring twice.

For any candidate transition type at any transition position, if this candidate transition type meets the predetermined matching degree adjustment strategy, an adjustment coefficient of 0 is subtracted from the matching degree of the candidate transition type; and if this candidate transition type does not meet the predetermined matching degree adjustment strategy, an adjustment coefficient of 100 is subtracted from the matching degree of the candidate transition type.

Based on this, after the matching degrees in Table 3 are adjusted, the adjusted matching degrees $Q(i, j)$ are obtained. Among them, i represents the transition position, and the range of values for i is (0, 1, 2); j represents the candidate transition type, and the range of values for j is (0, 1, 2, 3, 4). That is to say, $Q(i, j)$ is a superimposition value obtained by adding the weighted value of the picture matching degree of transition type j at transition position i and the weighted value of the music matching degree of transition type j at transition position i with the corresponding adjustment coefficient.

First, the adjusted matching degrees of the individual transition types at transition position 0 are calculated.

$Q(0, 0)=0.4\times0.4+0.6\times0.2/3-0=0.2$ $Q(0, 1)=0.4\times0.1+0.6\times0.15/3-100=-99.93$ $Q(0, 2)=0.4\times0.2+0.6\times0.3/3-0=0.14$ $Q(0, 3)=0.4\times0.17+0.6\times0.25/3-0=0.118$ $Q(0, 4)=0.4\times0.13+0.6\times0.15/3-0=0.082$ For transition position 1, it is assumed that transition type j is sequentially selected for transition position 1, and correspondingly, it is determined, under the assumed transition type j, which transition type should be selected for transition position 0 in such a manner that the sum of the matching degrees at transition position 0 and transition position 1 is the highest.

Among them, when transition type 0 is selected for transition position 1, the largest sum of the matching degrees at transition position 0 and transition position 1 is as follows:

$P_{(1, 0)}=\max\{Q(0, j)+0.4\times0.1+0.6\times0.2/3-\text{cost}_{p(1, 0)Q(0, j)}\};$ where $\text{cost}_{p(1, 0)Q(0, j)}$ refers to an adjustment coefficient that should be used for transition position 1 when transition type j is selected for transition position 0 in a case where transition type 0 is selected for transition position 1.

When transition type 0 is selected for transition position 1, transition type 0 occurs twice if transition type 0 is also selected for transition position 0, which does not meet the predetermined matching degree adjustment strategy. At this time, $\text{cost}_{p(1, 0)Q(0, 0)}$ corresponding to $Q(1, 0)$ is 100. Otherwise, if transition type 1 is selected for transition position 0, $\text{cost}_{p(1, 0)Q(0, 1)}$ corresponding to $Q(1, 0)$ is 0;
if transition type 2 is selected for transition position 0, $\text{cost}_{p(1, 0)Q(0, 2)}$ corresponding to $Q(1, 0)$ is 0;
if transition type 3 is selected for transition position 0, $\text{cost}_{p(1, 0)Q(0, 3)}$ corresponding to $Q(1, 0)$ is 0; and
if transition type 4 is selected for transition position 0, $\text{cost}_{p(1, 0)Q(0, 4)}$ corresponding to $Q(1, 0)$ is 0.

Correspondingly, $Q(0, 0)+0.4\times0.1+0.6\times0.2/3-100=-99.72$ $Q(0, 1)+0.4\times0.1+0.6\times0.2/3-0=-99.85$ $Q(0, 2)+0.4\times0.1+0.6\times0.2/3-0=0.22$ $Q(0, 3)+0.4\times0.1+0.6\times0.2/3-0=0.198$ $Q(0, 4)+0.4\times0.1+0.6\times0.2/3-0=0.162$ Therefore, when j=2, that is to say, when transition type 0 is selected for transition position 1 and transition type 2 is selected for transition position 0, the sum of the matching degrees at transition position 0 and transition position 1 is the largest, where $P_{(1, 0)}=\max\{Q(0, j)+0.4\times0.1+0.6\times0.2/3-\text{cost}_{p(1, 0)Q(0, j)}\}=0.22.$ Then, the structural element corresponding to transition type 0 at transition position 1 may be set as {(0, 2), 0.22}, which shows that transition position 0 and transition position 1 can obtain the best transition effects on a whole when transition type 0 is selected for current transition position 1 and transition type 2 is selected for previous transition position 0.

Similarly, when transition type 1 is selected for transition position 1, the largest sum of the matching degrees at transition position 0 and transition position 1 is as follows:

$P_{(1, 1)}=\max\{Q(0, j)+0.4\times0.35+0.6\times0.15/3-\text{cost}_{p(1, 1)Q(0, j)}\}.$ When j=0, $P_{(1, 1)}$ has a largest value of 0.37. Thus, the structural element corresponding to transition type 1 at transition position 1 is set as {(0, 0), 0.37}.

Similarly, when transition type 2 is selected for transition position 1, the largest sum of the matching degrees of transition position 0 and transition position 1 is as follows:

$P_{(1, 2)}=\max\{Q(0, j)+0.4\times0.15+0.6\times0.3/3-\text{cost}_{p(1, 2)Q(0, j)}\}.$ When j=0, $P_{(1, 2)}$ has a largest value of 0.32. Thus, the structural element corresponding to transition type 2 at transition position 1 is set as {(0, 0), 0.32}.

Similarly, when transition type 3 is selected for transition position 1, the largest sum of the matching degrees at transition position 0 and transition position 1 is as follows:

$P_{(1, 3)}=\max\{Q(0, j)+0.4\times0.2+0.6\times0.25/3-\text{cost}_{p(1, 3)Q(0, j)}\}.$ When j=0, $P_{(1, 3)}$ has a largest value of 0.33. Thus, the structural element corresponding to transition type 3 at transition position 1 is set as {(0, 0), 0.33}.

Similarly, when transition type 4 is selected for transition position 1, the largest sum of the matching degrees at transition position 0 and transition position 1 is as follows:

$P_{(1, 4)}=\max\{Q(0, j)+0.4\times0.2+0.6\times0.15/3-\text{cost}_{p(1, 4)Q(0, j)}\}.$ When j=0, $P_{(1, 4)}$ has a largest value of 0.31. Thus, the structural element corresponding to transition type 4 at transition position 1 is set as {(0, 0), 0.31}.

A part of the transition type retrieval structure constructed above is shown in Table 4 below.

TABLE 4

| Transition position 0 | — | — | — | — | — |
|---|---|---|---|---|---|
| Transition position 1 | (0, 2), 0.22 | (0, 0), 0.37 | (0, 0), 0.32 | (0, 0), 0.33 | (0, 0), 0.31 |

At this time, Q(1, 0), Q(1, 1), Q(1, 2), Q(1, 3), and Q(1, 4) are set as 0.22, 0.37, 0.32, 0.33, and 0.31, respectively.

For transition position 2, when transition type 0 is selected therefor, if transition type 0 is selected for transition position 1 at this time, transition type 0 occurs twice, which does not meet the predetermined matching degree adjustment strategy. Thus, $\text{cost}_{p(2, 0)Q(1, 0)}$ corresponding to $Q(2, 0)$ is 100.

As can be seen in combination with Table 4, if transition type 1, 2, 3, or 4 is selected for transition position 1 at this time, it will inevitably lead to the selection of transition type 0 for transition position 0. In this case, transition type 0 still occurs twice. Thus, $\text{cost}_{p(2, 0)Q(1, 1)}$, $\text{cost}_{p(2, 0)Q(1, 2)}$, $\text{cost}_{p(2, 0)Q(1, 3)}$ and $\text{cost}_{p(2, 0)Q(1, 4)}$ corresponding to $Q(2, 0)$ are all 100.

Therefore, for transition position 2, when transition type 0 is selected therefor, the largest sum of the matching degrees at transition position 1 and transition position 2 is as follows:

$$P_{(2,\ 0)} = \max\{Q(1, j) + 0.4 \times 0.3 + 0.6 \times 0.2/3 - 100\}.$$

When j=1, $P_{(2,\ 0)}$ has a largest value −99.47. Thus, the structural element corresponding to transition type 0 at transition position 2 is set as $\{(1, 1), -99.47\}$.

It may be supplemented that, the two predetermined matching degree adjustment strategies, i.e., transition type 1 being prohibited from occurring at transition position 0 and transition position 2, and transition type 1 being prohibited from occurring twice, correspond to their respective adjustment coefficients cost. For any transition type at any transition position, if it does not meet both the two predetermined matching degree adjustment strategies, the respective adjustment coefficients cost corresponding to the two predetermined matching degree adjustment strategies are all subtracted from the matching degree of the transition type.

For transition position 2, when transition type 1 is selected therefor:

As can be seen in combination with Table 4, if transition type 0 is selected for transition position 1 at this time, transition type 2 is selected for transition position 0. In this case, transition type 1 does not occur twice, but transition type 1, which is forbidden from occurring at transition position 2, occurs at transition position 2. Thus, $\cost_{p(2,\ 1)Q(1,\ 0)}$ is 100.

As can be seen in combination with Table 4, if transition type 1 is selected for transition position 1 at this time, it will inevitably lead to the selection of transition type 0 for transition position 0. In this case, transition type 1 occurs twice, and transition type 1, which is forbidden from occurring at transition position 2, occurs at transition position 2. At this time, both the two predetermined matching degree adjustment strategies are not met. Thus, $\cost_{p(2,\ 1)Q(1,\ 1)}$ is 200.

As can be seen in combination with Table 4, if transition type 2, 3, or 4 is selected for transition position 1 at this time, it will inevitably lead to the selection of transition type 0 for transition position 0. In this case, the transition type 1 does not occur twice, but transition type 1, which is forbidden from occurring at transition position 2, occurs at transition position 2. Thus, $\cost_{p(2,\ 1)Q(1,\ 2)}$, $\cost_{p(2,\ 1)Q(1,\ 3)}$, $\cost_{p(2,\ 1)Q(1,\ 4)}$ are all 100.

$$P_{(2,\ 1)} = \max\{Q(1, j) + 0.4 \times 0.4 + 0.6 \times 0.15/3 - \cost_{p(2,\ 1)Q(1, j)}\}.$$

When j=3, $P_{(2,\ 1)}$ has a largest value of −99.51. Thus, the structural element corresponding to transition type 1 at transition position 2 is set as $\{(1, 3), -99.51\}$.

For transition position 2, when transition type 2 is selected therefor:

If transition type 0 is selected for transition position 1 at this time, referring to Table 4, it will inevitably lead to the selection of transition type 2 for transition position 0. In this case, transition type 2 occurs twice. Thus, $\cost_{p(2,\ 2)Q(1,\ 0)}$ is 100.

If transition type 2 is selected for transition position 1 at this time, referring to Table 4, it will inevitably lead to the selection of transition type 0 for transition position 0. In this case, transition type 2 occurs twice. Thus, $\cost_{p(2,\ 2)Q(1,\ 2)}$ is 100.

If transition type 1, 3, or 4 is selected for transition position 1 at this time, referring to Table 4, it will inevitably lead to the selection of transition type 0 for transition position 0. In this case, the predetermined matching degree adjustment strategies are met. Thus, $\cost_{p(2,\ 2)Q(1,\ 1)}$, $\cost_{p(2,\ 2)Q(1,\ 3)}$, $\cost_{p(2,\ 2)Q(1,\ 4)}$ are all 0.

$$P_{(2,\ 2)} = \max\{Q(1, j) + 0.4 \times 0.12 + 0.6 \times 0.3/3 - \cost_{p(2,\ 2)Q(1, j)}\}.$$

When j=1, $P_{(2,\ 2)}$ has a largest value of 0.478. Thus, the structural element corresponding to transition type 1 at transition position 2 is set as $\{(1, 1), 0.478\}$.

For transition position 2, when transition type 3 is selected therefor:

If transition type 0 is selected for transition position 1 at this time, referring to Table 4, it will inevitably lead to the selection of transition type 2 for transition position 0. In this case, the predetermined matching degree adjustment strategies are met. Thus, $\cost_{p(2,\ 3)Q(1,\ 0)}$ is 0.

If transition type 1, 2, or 4 is selected for transition position 1 at this time, referring to Table 4, it will inevitably lead to the selection of transition type 0 for transition position 0. In this case, the predetermined matching degree adjustment strategies are met. Thus, $\cost_{p(2,\ 3)Q(1,\ 1)}$, $\cost_{p(2,\ 3)Q(1,\ 2)}$, and $\cost_{p(2,\ 3)Q(1,\ 4)}$ are all 0.

If transition type 3 is selected for transition position 1 at this time, referring to Table 4, it will inevitably lead to the selection of transition type 0 for transition position 0. In this case, transition type 3 occurs twice, only one predetermined matching degree adjustment strategy is not met. Thus, $\cost_{p(2,\ 2)Q(1,\ 3)}$ is 100.

$$P_{(2,\ 3)} = \max\{Q(1, j) + 0.4 \times 0.08 + 0.6 \times 0.25/3 - \cost_{p(2,\ 3)Q(1, j)}\}.$$

When j=1, $P_{(2,\ 3)}$ has a largest value of 0.452. Thus, the structural element corresponding to transition type 3 at transition position 2 is set as $\{(1, 1), 0.452\}$.

For transition position 2, when transition type 4 is selected therefor:

If transition type 0 is selected for transition position 1 at this time, referring to Table 4, it will inevitably lead to the selection of transition type 2 for transition position 0. In this case, the predetermined matching degree adjustment strategies are met. Thus, $\cost_{p(2,\ 4)Q(1,\ 0)}$ is 0.

If transition type 1, 2, or 3 is selected for transition position 1 at this time, referring to Table 4, it will inevitably lead to the selection of transition type 0 for transition position 0. In this case, the predetermined matching degree adjustment strategies are met. Thus, $\cost_{p(2,\ 4)Q(1,\ 1)}$, $\cost_{p(2,\ 4)Q(1,\ 2)}$, and $\cost_{p(2,\ 4)Q(1,\ 3)}$ are all 0.

If transition type 4 is selected for transition position 1 at this time, referring to Table 4, it will inevitably lead to the selection of transition type 0 for transition position 0. In this case, transition type 4 occurs twice, and only one predetermined matching degree adjustment strategy is not met. Thus, $\cost_{p(2,\ 4)Q(1,\ 4)}$ is 100.

$$P_{(2,\ 4)} = \max\{Q(1, j) + 0.4 \times 0.1 + 0.6 \times 0.15/3 - \cost_{p(2,\ 4)Q(1, j)}\}.$$

When j=1, $P_{(2,\ 4)}$ has a largest value of 0.44. Thus, the structural element corresponding to transition type 4 at transition position 2 is set as $\{(1, 1), 0.44\}$. At this time, Q(2, 0), Q(2, 1), Q(2, 2), Q(2, 3), and Q(2, 4) are set as −99.47, −99.51, 0.478, 0.452, and 0.44, respectively.

Finally, the obtained complete transition type retrieval structure is shown in Table 5.

TABLE 5

| Transition position 0 | — | — | — | — | — |
|---|---|---|---|---|---|
| Transition position 1 | (0, 2), 0.22 | (0, 0), 0.37 | (0, 0), 0.32 | (0, 0), 0.33 | (0, 0), 0.31 |
| Transition position 2 | (1, 1), −99.47 | (1,3), −99.51 | (1, 1), 0.478 | (1, 1), 0.452 | (1, 1), 0.44 |

Based on Table 5, it can be seen that, at transition position 2, transition type 2 corresponds to the highest matching degree at this time.

At the same time, based on the structural element {(1, 1), 0.478} for transition type 2 at transition position 2 in the transition type retrieval structure, it can be known that the largest sum of the matching degrees is obtained when transition type 1 is selected for transition position 1, on the premise that transition type 2 is selected for transition position 2.

Next, based on the structure element {(0, 0), 0.37} for transition type 1 at transition position 1 in the transition type retrieval structure, it can be known that the largest sum of the matching degrees is obtained when transition type 0 is selected for transition position 0, on the premise that transition type 1 is selected for transition position 1.

Based on the above principle, by retrieving in the transition type retrieval structure with the dynamic planning algorithm, the final matching result for the transition types is obtained as follows: transition type 0 is used at transition position 0, transition type 1 is used at transition position 1, and transition type 2 is used at transition position 2.

In addition, any type of transition type retrieval structure may be constructed using the matching degrees of multiple candidate transition types at each transition position, and the types of transition type retrieval structures include but are not limited to the above one. For any type of transition type retrieval structure, the matching result for the transition types may be obtained using any search algorithm including, but not limited to, the dynamic planning algorithm.

It should be supplemented that the technical solutions of Embodiments 1 to 10 may be executed in the Software Development Kit (SDK) of the client. The client has VE (which is video communication software) SDK, algorithm SDK and effect SDK.

Specifically, the algorithm SDK may acquire respective picture matching degrees of multiple candidate transition types at each transition position of the video, and respective music matching degrees of the multiple candidate transition types; based on the picture matching degrees and the music matching degrees, it may obtain, through processing, the matching degrees of the multiple candidate transition types at each transition position; and finally, it may determine the target transition type for each transition position.

Alternatively, the algorithm SDK may acquire respective picture matching degrees of multiple candidate transition types at each transition position of the video, and respective music matching degrees of the multiple candidate transition types, and send the acquired contents to the VE SDK. The VE SDK obtains, based on the picture matching degrees and the music matching degrees, the matching degrees of the multiple candidate transition types at each transition position, and finally determines the target transition type for each transition position. Finally, the VE SDK sends the target transition type to the effect SDK, and the effect SDK performs the rendering operation.

Of course, the technical solutions of Embodiments 1 to 10 may also be implemented in any module or electronic device capable of realizing video processing, according to actual needs.

Figure 8:
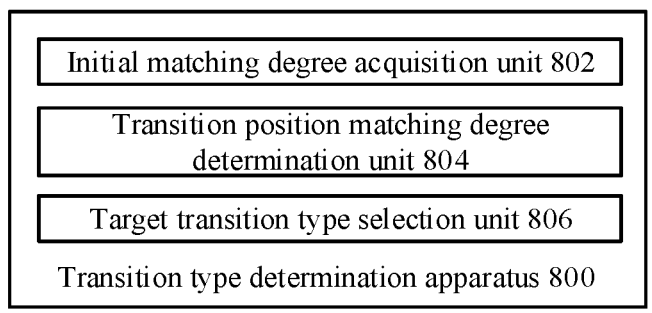
FIG. 8 illustrates a block diagram of a transition type determination apparatus according to an embodiment of the present disclosure.

FIG. 8 shows a block diagram of a transition type determination apparatus according to an embodiment of the present disclosure.

As shown in FIG. 8, an embodiment of the present disclosure provides a transition type determination apparatus 800, which includes: an initial matching degree acquisition unit 802, configured to acquire a picture matching degree of a candidate transition type with a transition position between two adjacent video clips, and a music matching degree of the candidate transition type, where the picture matching degree is determined according to the two adjacent video clips and the candidate transition type, and the music matching degree is determined according to the candidate transition type and background music of a video to which the two adjacent video clips belongs; a transition position matching degree determination unit 804, configured to determine a matching degree of the candidate transition type at the transition position, based on the acquired picture matching degree and the acquired music matching degree; and a target transition type selection unit 806, configured to determine, according to the matching degree, whether to determine the candidate transition type as a target transition type for the transition position, where the target transition type is used for a transition effect between the two adjacent video clips.

In the above embodiment of the present disclosure, in an implementation, the target transition type selection unit 806 is further configured to: if the transition position is a designated transition position in the video, determine a designated transition type corresponding to the designated transition position as the target transition type for the transition position.

In the above embodiment of the present disclosure, in an implementation, the target transition type selection unit 806 is further configured to: add a first adjustment coefficient to the matching degree of the candidate transition type, when the transition position is the designated transition position in the video and if the candidate transition type is another transition type other than the designated transition type, where the first adjustment coefficient is used to make the candidate transition type excluded for the target transition type.

In the above embodiment of the present disclosure, in an implementation, if the target transition type occurs at the transition position, the number of occurrences of the target transition type should be less than a first specified number of times, and/or the number of consecutive occurrences of the target transition type should be less than a second specified number.

In the above embodiment of the present disclosure, in an implementation, the target transition type selection unit 806 is further configured to: add a second adjustment coefficient to the matching degree of the candidate transition type, when the candidate transition type occurs at the transition position and if the number of occurrences of the candidate transition type is greater than or equal to the first specified number of times, and/or if the number of consecutive occurrences of the candidate transition type is greater than or equal to the second specified number of times, where the second adjustment coefficient is used to make the candidate transition type excluded for the target transition type.

In the above embodiment of the present disclosure, in an implementation, the target transition type selection unit 806 is further configured to: when the transition position is a first transition position of the video, determine the matching degree corresponding to the candidate transition type at the first transition position as a largest matching degree of the candidate transition type at this transition position; when the transition position is a non-first transition position of the video, determine, based on the matching degree of the candidate transition type at this transition position, and on respective largest matching degrees of the candidate transition type and other candidate transition types at a previous transition position preceding this transition position in the video, a largest matching degree of the candidate transition type at this transition position, and a candidate transition type that should be selected for the previous transition position when this transition position obtains its largest matching degree; and select a corresponding target transition type for each transition position of the video, based on the respective largest matching degrees of the candidate transition type and other candidate transition types at each of the non-first transition positions, and on the candidate transition type that should be selected for a previous transition position preceding each of the non-first transition positions when the non-first transition position obtains its largest matching degree.

The transition type determination apparatus 800 uses the solutions described in any one of Embodiments 1 to 10. Therefore, it has all the above technical effects, and details of which are not repeated here.

Figure 9:
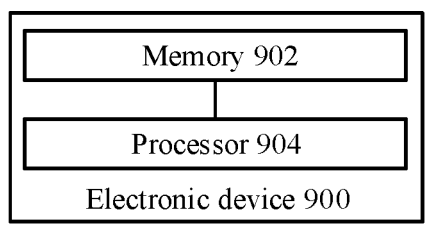
FIG. 9 illustrates a block diagram of an electronic device according to an embodiment of the present disclosure.

FIG. 9 shows a block diagram of an electronic device according to an embodiment of the present disclosure.

As shown in FIG. 9, an electronic device 900 according to an embodiment of the present disclosure includes at least one memory 902 and at least one processor 904 communicatively connected with the at least one memory 902. The memory stores instructions executable by the at least one processor 904. The instructions are configured to execute the solutions described in any one of the foregoing Embodiments 1 to 10. Therefore, the electronic device 900 has the same technical effects as any one of Embodiments 1 to 10, which will not be repeated here.

The electronic device of the embodiment of the present disclosure may exist in various forms, including but is not limited to:

(1) Mobile communication device: this type of device has a characteristic of mobile communication function, and mainly aims to provide voice and data communication. Such terminal includes: smart phone (e.g., iPhone), multimedia phone, feature phone, low-end phone, and the like.

(2) Ultra-mobile personal computer device: this type of device belongs to a personal computer, has computing and processing functions, and generally has mobile Internet access features. Such terminal includes: Personal Digital Assistant (PDA), Mobile Internet Device (MID), Ultra Mobile Personal Computer (UMPC) and the like, such as iPad.

(3) Portable entertainment device: this type of device may display and play multimedia contents. Such device includes: audio and video players (e.g., iPod), handheld game console, e-book, smart toy, and portable vehicle-mounted navigation device.

(4) Other electronic devices with data interaction functions.

In addition, the embodiments of the present disclosure provide a non-transitory computer-readable storage medium storing computer-executable instructions, where the computer-executable instructions are configured to execute the methods described in any one of the foregoing Embodiments 1 to 10.

Embodiments of the present disclosure further provide a computer program product, which includes a computer program carried on a computer-readable medium. The computer program, when being executed by a processor, causes the methods described in any one of the foregoing Embodiments 1 to 10 to be implemented.

The embodiments of the present disclosure further provide a computer program which, when running on an electronic device, causes the method described in any one of the foregoing Embodiments 1 to 10 to be implemented.

The technical solutions of the present disclosure have been described in detail with reference to the accompanying drawings. Through the technical solutions of the present disclosure, a transition type with high fitness to a transition position and enabling the best transition effect can be automatically selected for the transition position, which not only reduces the difficulty in implementing video transition, but also enables high-quality video transition effects, improving the user experience.

It should be appreciated that the term "and/or" used herein is intended to only describe an association relationship between associated objects, indicating that there may be three relationships. For example, A and/or B may indicate three cases: A exists alone, A and B exist at the same time, and B exists alone. In addition, the character "/" herein generally indicates that the associated objects are in an "or" relationship.

Depending on the context, the word "if" used herein may be interpreted as "when . . . ", or "in a case where . . . ", or "in response to determining", or "in response to detecting". Similarly, depending on the context, the phrase "if it is determined" or "if it is detected (the stated condition or event)" may be interpreted as "when it is determined" or "in response to determining" or "when it is detected (the stated condition or event), or "in response to detecting (the stated condition or event)".

In the several embodiments provided in this disclosure, it should be appreciated that the disclosed system, apparatus and methods may be implemented in other ways. For example, the apparatus embodiments described above are only illustrative. For example, the division of the units is only a logical function division. In actual implementation, there may be other division methods. For example, multiple units or components may be combined, or may be integrated into another system; or, some features may be omitted, or not implemented. In addition, the shown or discussed mutual coupling or direct coupling or communication connection may be implemented through some interfaces, and the indirect coupling or communication connection of devices or units may be electrical, mechanical or in other forms.

In addition, the individual functional units in the various embodiments of the present disclosure may be integrated into one processing unit, or each unit may exist physically alone, or two or more units may be integrated into one unit. The above-mentioned integrated unit may be implemented in the form of hardware, or in the form of hardware plus software functional units.

The above-mentioned integrated unit implemented in the form of software functional units may be stored in a computer-readable storage medium. The above-mentioned software functional units are stored in a storage medium, and include several instructions to cause a computer device (which may be a personal computer, a server, or a network device, etc.) or a processor to execute some steps of the methods described in the various embodiments of the present disclosure. The aforementioned storage medium includes: U disk, mobile hard disk, read-only memory (ROM), random access memory (RAM), magnetic disk or optical disk or other media that can store program codes.

The foregoing are only preferred embodiments of the present disclosure, and are not intended to limit the present disclosure. Any modifications, equivalent replacements, improvements, etc. made within the spirit and principles of the present disclosure shall fall within the scope of protection of the present disclosure.

What is claimed is:

1. A transition type determination method, comprising:
   acquiring a picture matching degree of a candidate transition type with a transition position between two adjacent video clips, and acquiring a music matching degree of the candidate transition type; wherein the picture matching degree is determined according to the two adjacent video clips and the candidate transition type, and the music matching degree is determined according to the candidate transition type and background music of a video to which the two adjacent video clips belong;
   determining, based on the acquired picture matching degree and the acquired music matching degree, a matching degree of the candidate transition type at the transition position; and
   determining, according to the matching degree, whether to determine the candidate transition type as a target transition type for the transition position, wherein the target transition type is used for a transition effect between the two adjacent video clips.

2. The transition type determination method according to claim 1, wherein the determining, based on the acquired picture matching degree and the acquired music matching degree, a matching degree of the candidate transition type at the transition position comprises:
   performing weighting processing on the acquired picture matching degree and the acquired music matching degree, to obtain the matching degree of the candidate transition type at the transition position.

3. The transition type determination method according to claim 1, further comprising:
   acquiring a predetermined transition type selection strategy, wherein the predetermined transition type selection strategy defines that, if the transition position is a designated transition position in the video, the target transition type at the transition position is selected from at least one designated transition type corresponding to the designated transition position; and
   wherein the determining, according to the matching degree, whether to determine the candidate transition type as a target transition type for the transition position comprises:
   adding a first adjustment coefficient to the matching degree of the candidate transition type, when the transition position is the designated transition position in the video and if the candidate transition type is another transition type other than the at least one designated transition type, wherein the first adjustment coefficient is used to make the candidate transition type excluded for the target transition type.

4. The transition type determination method according to claim 3, wherein the predetermined transition type selection strategy further defines that, if the target transition type occurs at the transition position, the number of occurrences of the target transition type is less than a first specified number of times; and
   wherein the determining, according to the matching degree, whether to determine the candidate transition type as a target transition type for the transition position further comprises:
   adding a second adjustment coefficient to the matching degree of the candidate transition type, when the candidate transition type occurs at the transition position and if the number of occurrences of the candidate transition type is greater than or equal to the first specified number of times, wherein the second adjustment coefficient is used to make the candidate transition type excluded for the target transition type.

5. The transition type determination method according to claim 3, wherein the predetermined transition type selection strategy further defines that, when the target transition type occurs at the transition position, the number of consecutive occurrences of the target transition type is less than a second specified number of times; and
   wherein the determining, according to the matching degree, whether to determine the candidate transition type as a target transition type for the transition position further comprises:
   adding a second adjustment coefficient to the matching degree of the candidate transition type, when the candidate transition type occurs at the transition position and if the number of consecutive occurrences of the candidate transition type is greater than or equal to the second specified number of times, wherein the second adjustment coefficient is used to make the candidate transition type excluded for the target transition type.

6. The transition type determination method according to claim 3, wherein the predetermined transition type selection strategy further defines that, when the target transition type occurs at the transition position, the number of occurrences of the target transition type is less than a first specified number of times, and the number of consecutive occurrences of the candidate transition type is less than a second specified number of times; and
   wherein the determining, according to the matching degree, whether to determine the candidate transition type as a target transition type for the transition position further comprises:
   adding a second adjustment coefficient to the matching degree of the candidate transition type, when the candidate transition type occurs at the transition position and if the number of occurrences of the candidate transition type is greater than or equal to the first specified number of times and the number of consecutive occurrences of the candidate transition type is greater than or equal to the second specified number of times, wherein the second adjustment coefficient is used to make the candidate transition type excluded for the target transition type.

7. The transition type determination method according to claim 4, wherein there are a plurality of transition positions in the video, and the determining, according to the matching degree, whether to determine the candidate transition type as a target transition type for the transition position, further comprises:
   when the transition position is a first transition position of the video, determining the matching degree of the candidate transition type at the first transition position, as a largest matching degree of the candidate transition type at the transition position;

when the transition position is a non-first transition position of the video, based on the matching degree of the candidate transition type at this transition position, and on respective largest matching degrees of the candidate transition type and other candidate transition types at a previous transition position preceding this transition position in the video, determining a largest matching degree of the candidate transition type at this transition position, and determining a candidate transition type that should be selected for the previous transition position when this transition position has the largest matching degree; and selecting a corresponding target transition type for each transition position of the video, based on respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

8. The transition type determination method according to claim 5, wherein there are a plurality of transition positions in the video, and the determining, according to the matching degree, whether to determine the candidate transition type as a target transition type for the transition position, further comprises:

when the transition position is a first transition position of the video, determining the matching degree of the candidate transition type at the first transition position, as a largest matching degree of the candidate transition type at the transition position;

when the transition position is a non-first transition position of the video, based on the matching degree of the candidate transition type at this transition position, and on respective largest matching degrees of the candidate transition type and other candidate transition types at a previous transition position preceding this transition position in the video, determining a largest matching degree of the candidate transition type at this transition position, and determining a candidate transition type that should be selected for the previous transition position when this transition position has the largest matching degree; and selecting a corresponding target transition type for each transition position of the video, based on respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

9. The transition type determination method according to claim 6, wherein there are a plurality of transition positions in the video, and the determining, according to the matching degree, whether to determine the candidate transition type as a target transition type for the transition position, further comprises:

when the transition position is a first transition position of the video, determining the matching degree of the candidate transition type at the first transition position, as a largest matching degree of the candidate transition type at the transition position;

when the transition position is a non-first transition position of the video, based on the matching degree of the candidate transition type at this transition position, and on respective largest matching degrees of the candidate transition type and other candidate transition types at a previous transition position preceding this transition position in the video, determining a largest matching degree of the candidate transition type at this transition position, and determining a candidate transition type that should be selected for the previous transition position when this transition position has the largest matching degree; and selecting a corresponding target transition type for each transition position of the video, based on respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

10. The transition type determination method according to claim 1, wherein there are a plurality of candidate transition types, and the determining, according to the matching degree, whether to determine the candidate transition type as a target transition type for the transition position, further comprises:

selecting, from the plurality of candidate transition types, a candidate transition type with the largest matching degree at the transition position, as the target transition type for the transition position.

11. An electronic device, comprising: at least one processor, and a memory communicatively connected with the at least one processor, wherein the memory stores instructions executable by the at least one processor, and the instructions are configured to cause the at least one processor to:

acquire a picture matching degree of each of a plurality of candidate transition types with each of transition positions of a video, and acquire music matching degrees of the plurality of candidate transition types, wherein each transition position is between two adjacent video clips of the video, the picture matching degree of each candidate transition type at each transition position is determined according to the two adjacent video clips corresponding to the transition position and the candidate transition type, and the music matching degree of each candidate transition type is determined according to the candidate transition type and background music of the video;

determine, based on the acquired picture matching degrees and the acquired music matching degrees, matching degrees of the plurality of candidate transition types at each transition position; and determine, according to the matching degrees, a target transition type for each transition position, wherein the target transition type for each transition position is used for a transition effect between the two adjacent video clips corresponding to the transition position.

12. The electronic device according to claim 11, wherein the instructions are further configured to cause the at least one processor to:

for each of the plurality of candidate transition types at each transition position, perform weighting processing on the acquired picture matching degree and the acquired music matching degree of the candidate transition type at the transition position, to obtain the matching degree of the candidate transition type at the transition position.

13. The electronic device according to claim 12, wherein the instructions are further configured to cause the at least one processor to: acquire a predetermined transition type selection strategy, wherein the predetermined transition type selection strategy defines that, for each transition position, if the transition position is a designated transition position in the video, the target transition type at the transition position is selected from at least one designated transition type corresponding to the designated transition position.

14. The electronic device according to claim 13, wherein the instructions are further configured to cause the at least one processor to: for each of the plurality of candidate transition types at each transition position, add a first adjustment coefficient to the matching degree of the candidate transition type at the transition position, when the transition position is the designated transition position in the video and if the candidate transition type is another transition type other than the at least one designated transition type, wherein the first adjustment coefficient is used to make the candidate transition type excluded for the target transition type.

15. The electronic device according to claim 14, wherein the predetermined transition type selection strategy further defines that, for each transition position, if the target transition type occurs at the transition position, the number of occurrences of the target transition type is less than a first specified number of times; and the instructions are further configured to cause the at least one processor to: for each of the plurality of candidate transition types at each transition position, add a second adjustment coefficient to the matching degree of the candidate transition type at the transition position, when the candidate transition type occurs at the transition position and if the number of occurrences of the candidate transition type is greater than or equal to the first specified number of times, wherein the second adjustment coefficient is used to make the candidate transition type excluded for the target transition type.

16. The electronic device according to claim 14, wherein the predetermined transition type selection strategy further defines that, for each transition position, when the target transition type occurs at the transition position, the number of consecutive occurrences of the target transition type is less than a second specified number of times; and the instructions are further configured to cause the at least one processor to: for each of the plurality of candidate transition types at each transition position, add a second adjustment coefficient to the matching degree of the candidate transition type at the transition position, when the candidate transition type occurs at the transition position and if the number of consecutive occurrences of the candidate transition type is greater than or equal to the second specified number of times, wherein the second adjustment coefficient is used to make the candidate transition type excluded for the target transition type.

17. The electronic device according to claim 14, wherein the predetermined transition type selection strategy further defines that, for each transition position, when the target transition type occurs at the transition position, the number of occurrences of the target transition type is less than a first specified number of times, and the number of consecutive occurrences of the candidate transition type is less than a second specified number of times; and the instructions are further configured to cause the at least one processor to: for each of the plurality of candidate transition types at each transition position, add a second adjustment coefficient to the matching degree of the candidate transition type at the transition position, when the candidate transition type occurs at the transition position and if the number of occurrences of the candidate transition type is greater than or equal to the first specified number of times and if the number of consecutive occurrences of the candidate transition type is greater than or equal to the second specified number of times, wherein the second adjustment coefficient is used to make the candidate transition type excluded for the target transition type.

18. The electronic device according to claim 11, wherein the instructions are further configured to cause the at least one processor to: for each transition position, selecting, from the plurality of candidate transition types, a candidate transition type with the largest matching degree at the transition position, as the target transition type for the transition position.

19. The electronic device according to claim 11, wherein the instructions are further configured to cause the at least one processor to:

when the transition position is a first transition position of the video, determine the matching degree of the candidate transition type at the first transition position, as a largest matching degree of the candidate transition type at the transition position;

when the transition position is a non-first transition position of the video, based on the matching degree of the candidate transition type at this transition position, and on respective largest matching degrees of the candidate transition type and other candidate transition types at a previous transition position preceding this transition position in the video, determine a largest matching degree of the candidate transition type at this transition position, and determine a candidate transition type that should be selected for the previous transition position when this transition position has the largest matching degree; and select a corresponding target transition type for each transition position of the video, based on respective largest matching degrees of the candidate transition type and the other candidate transition types at each of non-first transition positions, and on a candidate transition type that should be selected for a previous transition position preceding each of the non-first transition positions when the non-first transition position obtains its largest matching degree.

20. A non-transitory storage medium storing computer-executable instructions thereon, wherein the computer-executable instructions are configured to implement a transition type determination method comprising:

acquiring a picture matching degree of a candidate transition type with a transition position between two adjacent video clips, and acquiring a music matching degree of the candidate transition type, wherein the picture matching degree is determined according to the two adjacent video clips and the candidate transition type, and the music matching degree is determined according to the candidate transition type and background music of a video to which the two adjacent video clips belong;

determining, based on the acquired picture matching degree and the acquired music matching degree, a matching degree of the candidate transition type at the transition position; and determining, based on the matching degree of the candidate transition type, a target transition type for the transition position, wherein the target transition type is used for a transition effect between the two adjacent video clips.

* * * * *